J. J. BURTSCHER.
CART.
APPLICATION FILED JUNE 12, 1917.
1,250,793.
Patented Dec. 18, 1917.
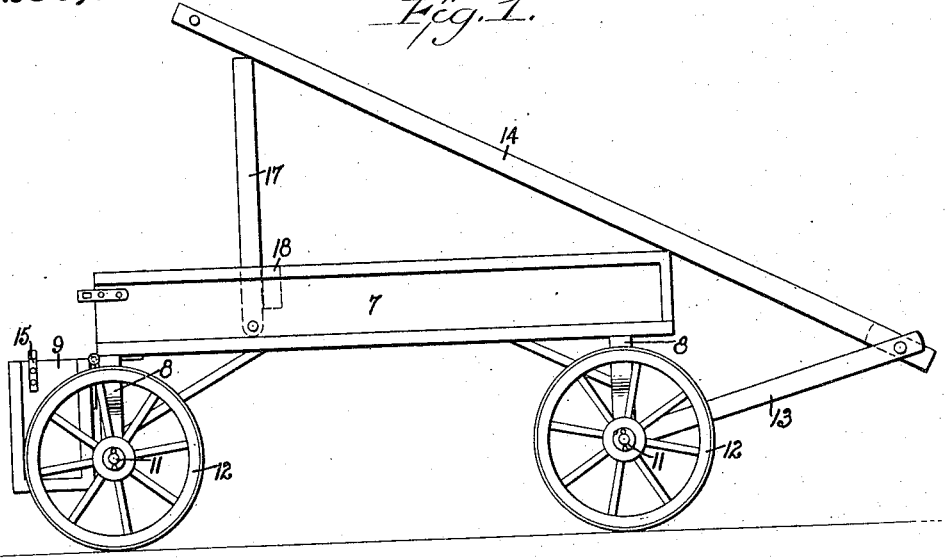
Fig. 1.
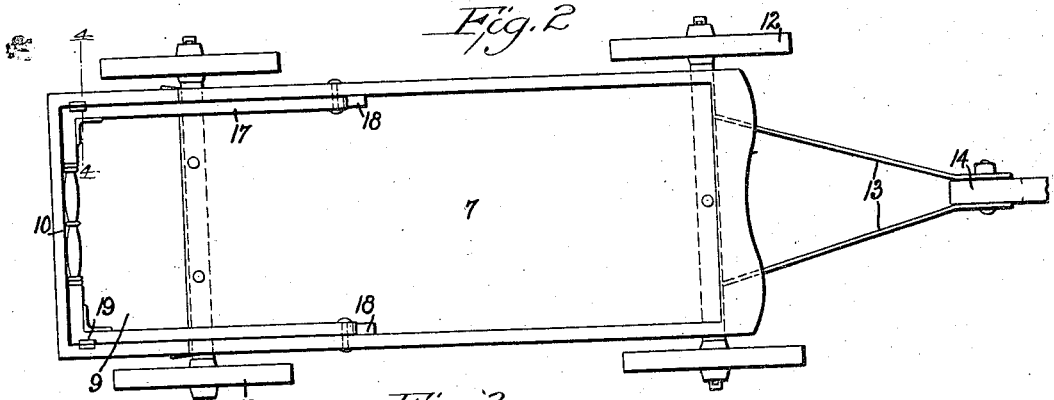
Fig. 2.
Fig. 3.
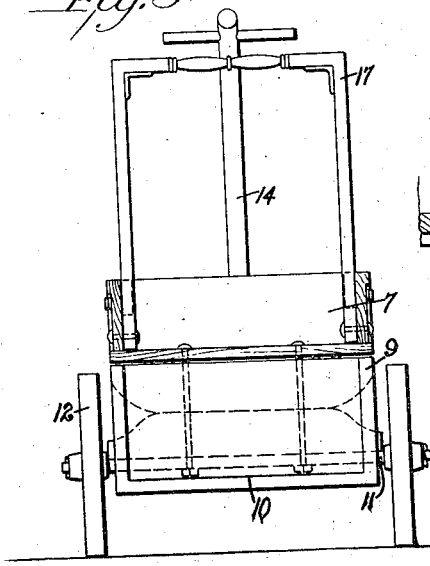
Fig. 4.
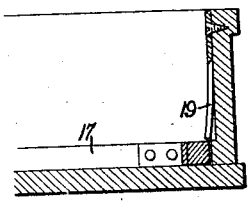
Fig. 5.
WITNESSES
Oliver W. Holmes
B. Joffe
INVENTOR
J. J. Burtscher
BY
ATTORNEYS

UNITED STATES PATENT OFFICE.

JOHN J. BURTSCHER, OF DEVILS LAKE, NORTH DAKOTA.

CART.

1,250,793.

Specification of Letters Patent.

Patented Dec. 18, 1917.

Application filed June 12, 1917. Serial No. 174,229.

*To all whom it may concern:*

Be it known that I, JOHN J. BURTSCHER, a citizen of the United States, and a resident of Devils Lake, in the county of Ramsey and State of North Dakota, have invented a new and Improved Cart, of which the following is a full, clear, and exact description.

My invention relates to children's carts, and it has reference more particularly to a push-cart which has a hinged section which may be used as a step in the rear of the cart to facilitate the propulsion of same by a child.

An object of the invention is to provide a simple, inexpensive and strong cart which can be easily transformed into a push-cart having a rear step.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation of a cart embodying my invention, the rear section of the cart being shown in a position to be used as a step;

Fig. 2 is a plan of the cart, the hinged section being locked to the main body;

Fig. 3 is a rear elevation of the cart as seen in Fig. 1;

Fig. 4 is an enlarged section on line 4—4, Fig. 2; and

Fig. 5 is a section through the locking means between the rear section and the main body portion of the cart.

Referring to the drawings, 7 is the cart body which is supported at the front and rear by bolsters 8, the rear bolster being located flush with the rear of the cart body 7 which is open. Thereat a body section 9 is hinged to the body 7, the length of which body section is such that the end wall 10 of said body section serves as a step when said section is suspended from the body 7, the rear bolster 8 serving as an abutment for said body section when the same is hanging down, as shown in Figs. 1 and 3. The bolsters 8 carry axles 11 which are provided with wheels 12, the front axle being mounted to pivot in its bolster, whereby the cart may be guided.

Arms 13 extend forwardly from the front axle. A tongue 14 is pivotally secured to said arms so that the same may be thrown rearwardly over the body 7 when the cart is to be propelled from the rear.

The body section 9 has lugs 15 at the sides thereof for which the body 7 has yielding catches 16. The engagement of said lugs with the catches locks the body section 9 to the body 7 and retains said body section in alinement with the body.

To facilitate the propulsion of the vehicle from the rear by a child, a handle 17 is provided in the body near the rear thereof. This handle is preferably U-shape. The ends of the handle are pivotally connected to the body near the bottom. The handle is prevented from swinging past the vertical toward the front of the body 7 by cleats 18. This handle can be folded against the bottom of the body when the body section 9 alines with the body 7. The body section is provided with yielding catches 19 in the sides thereof (see Fig. 4), locking the handle 17 at the bottom of the body 7 and body section 9. This arrangement, further, tends to retain the body section 9 in alinement with the body 7.

To raise the handle 17 the catches 19 must be depressed into the sides of the body section 9, which will permit the swinging of the handle 17 against the cleats 18. By pulling on the yielding catches 16 the rear section can be swung downwardly to the positions shown in Figs. 1 and 3. The bottom 10 can then be used as a step and the handle 17 as a grip for one of the ends, the extremity of the tongue being engaged by the other end for guiding the cart.

I claim:

1. A cart of the class described comprising,—a body, a body section hinged to the rear of the body and adapted to serve as a step when depending from the body, bolsters for said body, the rear bolster being adapted to serve as an abutment for the body section when the same depends from the body, means for locking said body section to the body when the same is in alinement with the body, and a handle pivotally secured to the body near the rear end thereof and adapted to swing rearwardly against the bottom of the body, said body section having means for locking said handle at the bottom when said body section is in alinement with the body.

2. In a cart of the class described, a body, a body section hinged to the rear of the body and adapted to serve as a step when depending from the body, bolsters for said body, the rear bolster being adapted to serve as an abutment for the body section when the same depends from the body, and means for locking said body section to the body when they are in alinement.

3. In a cart of the class described, a body, a body section hinged to the rear of the body and adapted to serve as a step when depending from the body, and means for locking the body section to the body when the former alines with the latter.

4. In a cart of the class described, a body, a step in the rear of the body, a handle pivotally secured to the body, means for preventing the swinging movement of the handle past the vertical when the same is moved toward the front of the cart body, and means for locking said handle at the bottom of the cart.

5. A cart of the class described comprising,—a body, a body section hinged to the rear of the body and adapted to serve as a step when depending from the body, means for locking said body section to the body when the former is in alinement with the latter, a U-shaped handle pivotally secured with the ends thereof near the rear to swing rearwardly against the bottom of the body, cleats on the sides of the body for engaging the handle when the same is in a substantially vertical position, whereby said handle is prevented from swinging toward the front of the cart body, and yielding members associated with the body section adapted to retain said handle at the bottom of the cart body when said body section alines with the body.

JOHN J. BURTSCHER.

Copies of this patent may be obtained for five cents each, by addressing the "Commissioner of Patents, Washington, D. C."